(12) United States Patent
Zhang et al.

(10) Patent No.: US 7,669,720 B2
(45) Date of Patent: *Mar. 2, 2010

(54) FUNCTIONAL POLYARYLETHERS

(75) Inventors: Yanshi Zhang, Schenectady, NY (US);
Daniel Steiger, Clifton Park, NY (US);
Joseph Anthony Suriano, Clifton Park, NY (US); Gary William Yeager, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 435 days.

This patent is subject to a terminal disclaimer.

(21) Appl. No.: 11/611,642

(22) Filed: Dec. 15, 2006

(65) Prior Publication Data

US 2008/0142418 A1    Jun. 19, 2008

(51) Int. Cl.
*B01D 71/52* (2006.01)
*B01D 71/50* (2006.01)
*B01D 71/66* (2006.01)
*B01D 71/68* (2006.01)
*C08G 61/00* (2006.01)

(52) U.S. Cl. ............... 210/500.27; 210/500.21; 210/500.4; 210/500.41; 210/500.23; 528/188; 528/142; 528/110; 528/86

(58) Field of Classification Search ............ None
See application file for complete search history.

(56) References Cited

U.S. PATENT DOCUMENTS

| 4,302,336 | A |   | 11/1981 | Kawaguchi et al. |
|---|---|---|---|---|
| 4,568,700 | A |   | 2/1986 | Warshawsky et al. |
| 4,690,766 | A | * | 9/1987 | Linder et al. ............... 210/654 |
| 4,833,219 | A |   | 5/1989 | Guiver et al. |
| 4,919,811 | A |   | 4/1990 | Davis |
| 4,971,695 | A |   | 11/1990 | Kawakami et al. |
| 4,996,271 | A |   | 2/1991 | Guiver et al. |
| 5,080,698 | A |   | 1/1992 | Krizan |
| 5,149,581 | A |   | 9/1992 | Matsuo et al. |
| 5,256,326 | A |   | 10/1993 | Kawato et al. |
| 5,288,834 | A |   | 2/1994 | Roovers et al. |
| 5,543,465 | A |   | 8/1996 | Bell et al. |
| 5,762,798 | A |   | 6/1998 | Wenthold et al. |
| 5,840,190 | A |   | 11/1998 | Scholander et al. |

(Continued)

FOREIGN PATENT DOCUMENTS

| DE | 10012332 | A1 | 10/2001 |
|---|---|---|---|
| DE | 10316318 | A1 | 10/2004 |
| DE | 10316323 | A1 | 10/2004 |
| EP | 214792 | A2 | 3/1987 |
| EP | 0506611 | A2 | 9/1992 |
| EP | 0997182 | A1 | 5/2000 |
| EP | 1080777 | A1 | 3/2001 |
| EP | 1201293 | A1 | 5/2002 |
| EP | 1424124 | A1 | 6/2004 |
| JP | 4288346 |    | 10/1992 |
| JP | 200566168 | A | 3/2005 |
| JP | 200628814 | A | 2/2008 |
| WO | 02-08301 | A2 | 1/2002 |
| WO | 03049775 | A2 | 6/2003 |
| WO | 2006051749 | A1 | 5/2006 |

OTHER PUBLICATIONS

"Halomethylated Polysulfone: Reactive Intermediates to Neutral and Ionic Film-Forming Polymers", A. Warshawsky et al., Journal of Polymer Science: Part A: Polymer Chemistry, vol. 28, 2885-2905 (1990).

(Continued)

*Primary Examiner*—Krishnan S Menon
(74) *Attorney, Agent, or Firm*—Mary Louise Gioeni

(57) ABSTRACT

Membranes comprising functional polyarylether having structural units of formula I are useful for hemodialysis and hemofiltration:

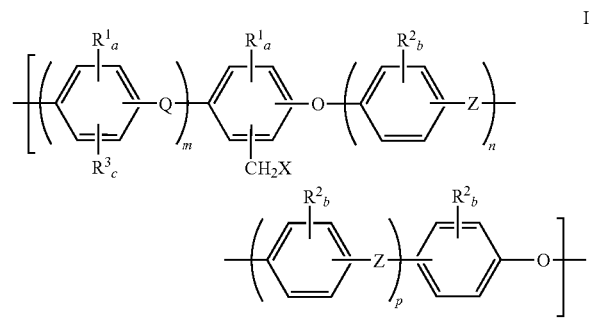

wherein
X is selected from Br, $NR^4R^5$, $OOCR^6$, $OR^7$, $NR^4CONR^5R^6$, $NR^4COOR^5R^6$ and combinations thereof;

$R^1$, $R^2$ and $R^3$ are independently at each occurrence $CH_2X$, H, halo, cyano, nitro, a $C_1$-$C_{12}$aliphatic radical, a $C_3$-$C_{12}$cycloaliphatic radical, a $C_3$-$C_{12}$aromatic radical or a combination thereof;

$R^4$ and $R^5$ are independently H, a $C_{1-10}$ aliphatic radical, a $C_3$-$C_{12}$cycloaliphatic radical, a $C_3$-$C_{12}$ aromatic radical, or a combination thereof;

$R^6$ is H, a $C_{2-10}$ aliphatic radical, a $C_3$-$C_{12}$ cycloaliphatic radical, a $C_3$-$C_{12}$ aromatic radical or a combination thereof;

$R^7$ is $OCH_2CH_2(OCH_2CH_2)_nOH$ or $OOCCH_2(OCH_2CH_2)_nCH_3$;

Z is a direct bond, O, S, SO, $SO_2$, CO, phenylphospinyl oxide, alkenyl, alkynyl, a $C_1$-$C_{12}$aliphatic radical, a $C_3$-$C_{12}$cycloaliphatic radical, a $C_3$-$C_{12}$ aromatic radical or a combination thereof;

a, b, and c are independently 1 or 2; and
m, n and p are independently 0 or 1.

20 Claims, No Drawings

U.S. PATENT DOCUMENTS

| | | | |
|---|---|---|---|
| 5,911,880 | A | 6/1999 | Klein et al. |
| 6,113,785 | A | 9/2000 | Muira et al. |
| 6,514,409 | B2 | 2/2003 | Kakiiuchi et al. |
| 6,632,361 | B2 | 10/2003 | Niklas et al. |
| 6,673,339 | B1 | 1/2004 | Atala et al. |
| 6,759,554 | B2 | 7/2004 | Buchwald et al. |
| 2002/0103306 | A1 | 8/2002 | Kerres et al. |
| 2003/0180596 | A1 | 9/2003 | Yoshimura et al. |
| 2006/0127728 | A1 | 6/2006 | Otsuki et al. |

OTHER PUBLICATIONS

"Heterogeneous Functionalizing of Polysufone Membranes", Ldger Breitbach et al., Die Angewandte Makromolekulare Chemie 184 (1991) 183-196.

"Polysulfone-Based Interpolymere Anion Exchange Membrane", A. Warshawsky et al., Journal of Membrane Science, 53, (1990) 37-44.

"Polysulfone-grat-Poly(ethylene glycol) graft Copolymers for Surface Modification of Polysulfone Membranes", Jane Y. Park et al., Biomaterials 27, (2006), 856-865.

"Miscible Blends from Poly(2,6-dimethyl-1,4-phenylene oxide) and Poly(epichlorohydrin) Containing Pendant Electron-Donor and Electron-Acceptor Groups", Coleen Pugh et al., Macromolecules (1986) 19, 65-71.

Bottino et al., "Synthesis and Characterization of Pendantly Amine Functionalized Poly(arylene Ether Sulfone)", Polymer, vol. 34, No. 13, pp. 2901-2902, 1993, XP002463710.

PCT Search Report dated Jan. 18, 2008.

ESP@CENET Abstract JP 2006-288414.

ESP@CENET Abstract JP 2005-066168.

Search Report of Jan. 2, 2008 PCT/US2007/076221.

Search Report of Nov. 26, 2007 PCT/US2007/074912.

Search Report of Dec. 7, 2007 PCT/US2007/074910.

Search Report of Jan. 31, 2008 PCT/US2007/075012.

\* cited by examiner

FUNCTIONAL POLYARYLETHERS

CROSS REFERENCE TO RELATED APPLICATIONS

This application is related to U.S. patent application Ser. No. 11/611,644 entitled "FUNCTIONAL POLYARYLETHERS", filed on Dec. 15, 2006, which is incorporated herein by reference.

BACKGROUND

The invention relates generally to functional polyarylethers for use in hollow fiber membranes.

In recent years, porous membranes, either in hollow fiber or flat sheet configurations have found use in hemodialysis and hemofiltration. Hemodialysis membranes are porous membranes permitting the passage of low molecular weight solutes, typically less than 5,000 Daltons, such as urea, creatinine, uric acid, electrolytes and water, yet preventing the passage of higher molecular weight proteins and blood cellular elements. Hemofiltration, which more closely represents the filtration in the glomerulus of the kidney, requires even more permeable membranes allowing complete passage of solutes of molecular weight of less than 50,000 Daltons, and, in some cases, less than 20,000 Daltons. The polymers used in these membranes must possess excellent mechanical properties so as to support the fragile porous membrane structure during manufacture and use. In addition, the polymer must have adequate thermal properties so as not to degrade during high temperature steam sterilization processes. Furthermore these membranes must have excellent biocompatibility, such that protein fouling is minimized and thrombosis of the treated blood does not occur. Though polysulfones have the mechanical and thermal properties necessary for these applications, they are insufficiently hydrophilic. To improve their hydrophilicity, polysulfones have been blended with hydrophilic polymers such as polyvinylpyrollidinone (PVP). However, since PVP is water soluble it is slowly leached from the porous polymer matrix creating product variability. Notwithstanding, the method of blending polysulfone with a hydrophilic polymer such as PVP is a commercially used process for producing hydrophilic porous polysulfone membranes for hemofiltration and hemodialysis.

Thus porous membranes possessing excellent thermal and mechanical properties and excellent biocompatibility for hemodialysis and hemofiltration are desired. In addition, polymers capable of being fabricated into porous membranes that possess sufficient hydrophilicity to obviate the need for blending with a hydrophilic polymers is also desired. Finally polymers which are more hydrophilic than polysulfone yet not water soluble, which may induce hydrophilicity to the porous polysulfone membranes without undesirably leaching from the membrane are also sought.

BRIEF DESCRIPTION

In one aspect, the present invention relates to functional polyarylethers and membranes, particularly hollow fiber membranes, composed of the functional polyarylethers, which include structural units of formula I

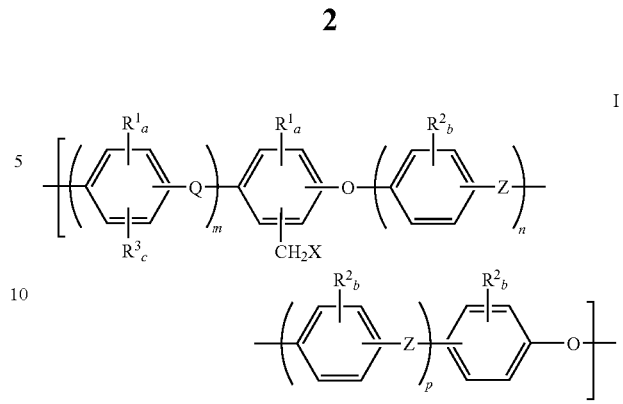

wherein

X is selected from Br, $NR^4R^5$, $OOCR^6$, $OR^7$, $NR^4CONR^5R^6$, $NR^4COOR^5R^6$ and combinations thereof;

$R^1$, $R^2$ and $R^3$ are independently at each occurrence $CH_2X$, H, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

$R^4$ and $R^5$ are independently H, a $C_{1-10}$ aliphatic radical, a $C_3$-$C_{12}$ cycloaliphatic radical, a $C_3$-$C_{12}$ aromatic radical, or a combination thereof;

$R^6$ is H, a $C_{2-10}$ aliphatic radical, a $C_3$-$C_{12}$ cycloaliphatic radical, a $C_3$-$C_{12}$ aromatic radical or a combination thereof;

$R^7$ is $OCH_2CH_2(OCH_2CH_2)_nOH$ or $OOCCH_2(OCH_2CH_2)_nCH_3$;

Z is a direct bond, O, S, SO, $SO_2$, CO, phenylphospinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2; and m, n and p are independently 0 or 1;

with the proviso that when Z is $C(CH_3)_2$, X is not Br or OAc.

In another aspect, the present invention relates to functional polyarylether comprising structural units of formula II

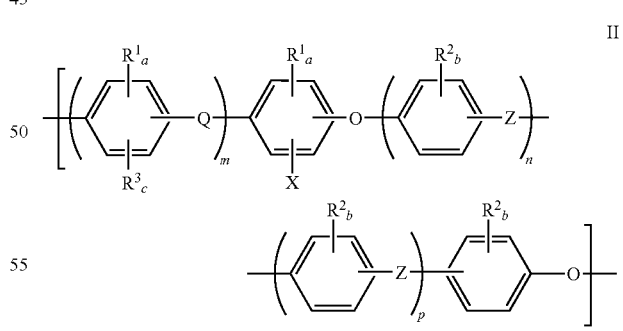

wherein

X is selected from Br, $NR^4R^5$, $OOCR^6$, $OR^7$, $NR^4COR^5$, $NR^4CONR^5R^6$, $NR^4COOR^5R^6$ and combinations thereof;

$R^1$, $R^2$ and $R^3$ are independently at each occurrence H, X, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

$R^4$ and $R^5$ are independently H, a $C_{1-10}$ aliphatic radical, a $C_3$-$C_{12}$ cycloaliphatic radical, a $C_3$-$C_{12}$ aromatic radical, or a combination thereof;

$R^6$ is H, a $C_{2-10}$ aliphatic radical, a $C_3$-$C_{12}$ cycloaliphatic radical, a $C_3$-$C_{12}$ aromatic radical or a combination thereof;

$R^7$ is $OCH_2CH_2(OCH_2CH_2)_nOH$ or $OOCCH_2(OCH_2CH_2)_nCH_3$;

Q is a direct bond, O, S, $CH_2$, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

Z is a direct bond, O, S, $CH_2$, SO, $SO_2$, CO, phenylphospinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2; and m, n and p are independently 0 or 1.

DETAILED DESCRIPTION

Hemodialysis is a process for removing substances through the blood by their unequal penetration through a permeable membrane. Hemodialysis membranes permit the passage of low molecular weight solutes, typically less than 5,000 Daltons, such as urea, creatinine, uric acid, electrolytes and water, but prevent the passage of higher molecular weight proteins and blood cellular elements. Hemofiltration, which more closely represents the filtration in the glomerulus of the kidney, requires more highly permeable membranes that allow complete passage of solutes of molecular weight of less than 50,000 Daltons, and, in some cases, less than 20,000 Daltons. Most dialyzers in use are of a hollow fiber design though designs employing flat sheet membranes are also commercially available with blood and dialysate generally flowing in opposite directions. Both methods comprise contacting blood with a porous hollow fiber membrane.

In particular embodiments, Z may be $SO_2$; Q may be a direct bond or $C(CH_3)_2$; X may be Br, $NR^4COR^5$, or more particularly, $OCH_2CH_2(OCH_2CH_2)_nOH$, $OOCCH_2(OCH_2CH_2)_nCH_3$,

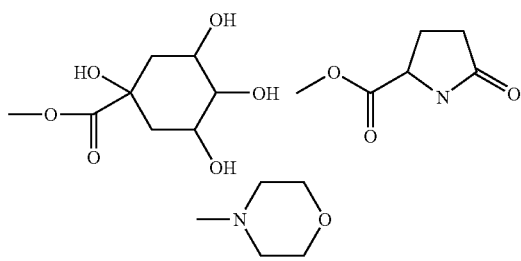

or a combination thereof.

The membranes of the present invention are composed of at least one functional polyarylether having structural units of formula I or formula II. In particular embodiments, the membrane may be a hollow fiber or in a flat sheet configuration.

In another aspect, the present invention relates to a process for preparing bromomethyl polyarylethers. In the process a brominating agent is mixed with a methyl polyarylether to form a bromomethyl polyarylether. The methyl polyarylether comprises structural units of formula

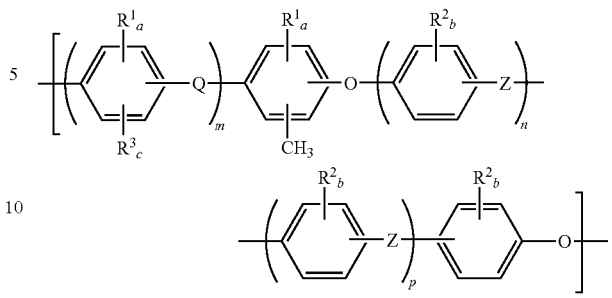

wherein $R^1$, $R^2$ and $R^3$ are independently at each occurrence $CH_2X$, H, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

Z is a direct bond, O, S, SO, $SO_2$, CO, phenylphospinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2; and m, n and p are independently 0 or 1.

In some embodiments, the mixture is irradiated to form the bromomethyl polyarylether. The bromomethyl polyarylether may be formed at a temperature ranging from about 150° C.-200° C. The bromomethyl polyarylether may be combined with a nucleophile under basic conditions to form a functional polyarylether; the nucleophile is selected from the group consisting of $HNR^4R^5$, $HOOCR^6$; $HOR^7$, $HNR^4CONR^5R^6$, $HNR^4COOR^5R^6$ and combinations thereof; $R^4$ and $R^5$ are independently H, a $C_{1-10}$ aliphatic radical, a $C_3$-$C_{12}$ cycloaliphatic radical, a $C_3$-$C_{12}$ aromatic radical, or a combination thereof; $R^6$ is H, a $C_{2-10}$ aliphatic radical, a $C_3$-$C_{12}$ cycloaliphatic radical, a $C_3$-$C_{12}$ aromatic radical or a combination thereof; and $R^7$ is $OCH_2CH_2(OCH_2CH_2)_nOH$ or $OOCCH_2(OCH_2CH_2)_nCH_3$.

In yet another aspect, the present invention relates to a process for preparing a functional polyarylether. The process includes combining a bromopolyarylether and a nucleophile with a copper catalyst under basic conditions. The bromoarylether comprises structural units of formula

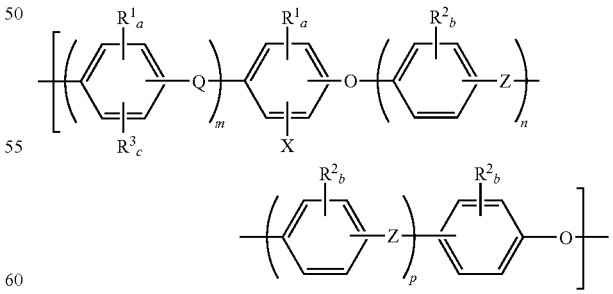

the nucleophile is selected from the group consisting of $HNR^4R^5$; $HOOCR^6$; $HOR^7$; $HNR^4COR^5$; $HNR^4CONR^4R^5$ and combinations thereof;

X is selected from Br, $NR^4R^5$, $OOCR^6$, $OR^7$, $NR^4COR^5$, $NR^4CONR^4R^5$ and combinations thereof;

$R^1$, $R^2$ and $R^3$ are independently at each occurrence $CH_2X$, H, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

$R^4$ and $R^5$ are independently H, a $C_{1-10}$ aliphatic radical, a $C_3$-$C_{12}$ cycloaliphatic radical, a $C_3$-$C_{12}$ aromatic radical, or a combination thereof;

$R^6$ is a $C_{2-10}$ aliphatic radical, a $C_3$-$C_{12}$ cycloaliphatic radical, a $C_3$-$C_{12}$ aromatic radical or a combination thereof;

$R^7$ is $OCH_2CH_2(OCH_2CH_2)_nOH$ or $OOCCH_2(OCH_2CH_2)_nCH_3$;

Z is a direct bond, O, S, $CH_2$, SO, $SO_2$, CO, phenylphosphinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2; and m, n and p are independently 0 or 1

The process may additionally include combining the bromopolyarylether, the nucleophile and the copper catalyst in the presence of a diamine ligand. In particular embodiments, the diamine ligand may be $CH_3NHCH_2CH_2NHCH_3$, and/or the bromopolyarylether, the nucleophile and the copper catalyst may be combined in a dioxane solvent.

Polyarylether are typically solvent resistant polymers with high glass transition temperature and/or melting point. The polyarylethers may be produced by reacting at least one dihalo aromatic compound with at least one aromatic dihydroxy compound in a polar aprotic solvent in the presence of an alkali metal compound, and optionally, in the presence of catalysts.

Exemplary dihalo aromatic compounds that may be used include 4,4'-bis(chlorophenyl)sulfone, 2,4'-bis(chlorophenyl)sulfone, 2,4-bis(chlorophenyl)sulfone, 4,4'-bis(fluorophenyl)sulfone, 2,4'-bis(fluorophenyl)sulfone, 2,4-bis(fluorophenyl)sulfone, 4,4'-bis(chlorophenyl)sulfoxide, 2,4'-bis(chlorophenyl)sulfoxide, 2,4-bis(chlorophenyl)sulfoxide, 4,4'-bis(fluorophenyl)sulfoxide, 2,4'-bis(fluorophenyl)sulfoxide, 2,4-bis(fluorophenyl)sulfoxide, 4,4'-bis(fluorophenyl)ketone, 2,4'-bis(fluorophenyl)ketone, 2,4-bis(fluorophenyl)ketone, 1,3-bis(4-fluorobenzoyl)benzene, 1,4-bis(4-fluorobenzoyl)benzene, 4,4'-bis(4-chlorophenyl)phenylphosphine oxide, 4,4'-bis(4-fluorophenyl)phenylphosphine oxide, 4,4'-bis(4-fluorophenylsulfonyl)-1,1'-biphenyl, 4,4'-bis(4-chlorophenylsulfonyl)-1,1'-biphenyl, 4,4'-bis(4-fluorophenylsulfoxide)-1,1'-biphenyl, and 4,4'-bis(4-chlorophenylsulfoxide)-1,1'-biphenyl.

Suitable aromatic dihydroxy compounds that may used to make the polyarylethers include 4,4'-dihydroxyphenyl sulfone, 2,4'-dihydroxyphenyl sulfone, 4,4'-dihydroxyphenyl sulfoxide, 2,4'-dihydroxyphenyl sulfoxide, bis(3,5-dimethyl-4-hydroxyphenyl) sulfoxide, bis(3,5-dimethyl-4-hydroxyphenyl)sulfone, 4,4-(phenylphosphinyl)diphenol, 4,4'-oxydiphenol,4,4'-thiodiphenol, 4,4'-dihydroxybenzophenone, 4,4'dihydroxyphenylmethane, hydroquinone, resorcinol, 5-cyano-1,3-dihydroxybenzene, 4-cyano-1,3,-dihydroxybenzene, 2-cyano-1,4-dihydroxybenzene, 2-methoxyhydroquinone, 2,2'-biphenol, 4,4'-biphenol, 2,2'-dimethylbiphenol 2,2',6,6'-tetramethylbiphenol, 2,2',3,3',6,6'-hexamethylbiphenol, 3,3',5,5'-tetrabromo-2,2'6,6'-tetramethylbiphenol, 4,4'-isopropylidenediphenol (bisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'(1,3-phenylenediisopropylidene)bisphenol (bisphenol M), 4,4'-isopropylidenebis(3-phenylphenol), 4,4'-isopropylidene-bis(2-phenylphenol), 4,4'-(1,4-phenylenediisoproylidene)bisphenol (bisphenol P), 4,4'-ethylidenediphenol (bisphenol E), 4,4'-oxydiphenol, 4,4'-thiodiphenol, 4,4'-thiobis(2,6-dimethylphenol), 4,4'-sufonyldiphenol, 4,4'-sufonylbis(2,6-dimethylphenol)4,4'-sulfinyldiphenol, 4,4'-hexafluoroisoproylidene)bisphenol (Bisphenol AF), 4,4'-hexafluoroisoproylidene)bis(2,6-dimethylphenol), 4,4'-(1-phenylethylidene)bisphenol (Bisphenol AP), 4,4'-(1-phenylethylidene)bis(2,6-dimethylphenol), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 2,2-bis(4-hydroxyphenyl) butane, 3,3-bis(4-hydroxyphenyl)pentane, 4,4'-(cyclopentylidene)diphenol, 4,4'-(cyclohexylidene)diphenol (Bisphenol Z), 4,4'-(cyclohexylidene)bis(2-methylphenol), 4,4'-(cyclododecylidene)diphenol, 4,4'-(bicyclo[2.2.1]heptylidene) diphenol, 4,4'-(9H-fluorene-9,9-diyl)diphenol, 3,3'-bis(4-hydroxyphenyl)isobenzofuran-1(3H)-one, 1-(4-hydroxyphenyl)-3,3'-dimethyl-2,3-dihydro-1H-inden-5-ol, 1-(4-hydroxy-3,5-dimethylphenyl)-1,3,3',4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), thiodiphenol (Bisphenol S), bis(4-hydroxyphenyl)diphenyl methane, bis (4-hydroxyphenoxy)-4,4'-biphenyl, 4,4'-bis(4-hydroxyphenyl)diphenyl ether, 9,9-bis(3-methyl-4-hydroxyphenyl)fluorene, and N-phenyl-3,3-bis-(4-hydroxyphenyl)phthalimide.

In particular embodiments, one of a or b may be 0. In specific embodiments, both a and b are 0, and the polyarylethersare composed of unsubstituted structural units, except for the functional substituent.

A basic salt of an alkali metal compound may be used to effect the reaction between the dihalo and dihydroxy aromatic compounds, and is not particularly limited so far as it can convert the aromatic dihydroxy compound to its corresponding alkali metal salt. Exemplary compounds include alkali metal hydroxides, such as, but not limited to, lithium hydroxide, sodium hydroxide, potassium hydroxide, rubidium hydroxide, and cesium hydroxide; alkali metal carbonates, such as, but not limited to, lithium carbonate, sodium carbonate, potassium carbonate, rubidium carbonate, and cesium carbonate; and alkali metal hydrogen carbonates, such as but not limited to lithium hydrogen carbonate, sodium hydrogen carbonate, potassium hydrogen carbonate, rubidium hydrogen carbonate, and cesium hydrogen carbonate. Combinations of compounds may also be used to effect the reaction.

Some examples of the aprotic polar solvent that may be effectively used to make the polyarylether include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethylsulfoxide (DMSO), diethylsulfoxide, sulfolane, 1-methyl-1-oxosulfolane, 1-ethyl-1-oxosulfolane, 1-phenyl-1-oxosulfolane, N,N'-dimethylimidazolidinone (DMI), diphenylsulfone, and combinations thereof. The amount of solvent to be used is typically an amount that is sufficient to dissolve the dihalo and dihydroxy aromatic compounds.

The reaction may be conducted at a temperature ranging from about 100° C. to about 300° C., ideally from about 120 to about 200° C., more preferably about 150 to about 200° C. Often when thermally unstable or reactive groups are present in the monomer and wish to be preserved in the polymer, temperatures in the regime of about 100 to about 120° C., in other embodiments from about 110 to about 145° C. is preferred. The reaction mixture is often dried by addition to the initial reaction mixture of, along with the polar aprotic solvent, a solvent that forms an azeotrope with water. Examples of such solvents include toluene, benzene, xylene, ethylbenzene and chlorobenzene. After removal of residual water by azeotropic drying, the reaction is carried out at the elevated temperatures described above. The reaction is typically conducted for a time period ranging from about 1 hour to about 72 hours, ideally about 1 hour to about 10 hours. Alternatively the bisphenol is converted in an initial step to its dimetallic phenolate salt and isolated and dried. The anhydrous dimetallic salt is used directly in the condensation polymerization reaction with a dihaloaromatic compound in a solvent, either a halogenated aromatic or polar aprotic, at temperatures from about 120 to about 300° C. The reaction may be carried out under ordinary pressure or pressurized conditions.

When halogenated aromatic solvents are used phase transfer catalysts may be employed. Suitable phase transfer catalysts include hexaalkylguanidinium salts and bis-guanidinium salts. Typically the phase transfer catalyst comprises an anionic species such as halide, mesylate, tosylate, tetrafluoroborate, or acetate as the charge-balancing counterion(s). Suitable guanidinium salts include those disclosed in U.S. Pat. Nos. 5,132,423; 5,116,975 and 5,081,298. Other suitable phase transfer catalysts include p-dialkylaminopyridinium salts, bis-dialkylaminopyridinium salts, bis-quaternary ammonium salts, bis-quaternary phosphonium salts, and phosphazenium salts. Suitable bis-quaternary ammonium and phosphonium salts are disclosed in U.S. Pat. No. 4,554,357. Suitable aminopyridinium salts are disclosed in U.S. Pat. No. 4,460,778; U.S. Pat. No. 4,513,141 and U.S. Pat. No. 4,681,949. Suitable phosphazenium salts are disclosed in U.S. patent application Ser. No. 10/950874. Additionally, in certain embodiments, the quaternary ammonium and phosphonium salts disclosed in U.S. Pat. No. 4,273,712 may also be used.

The dihalo aromatic compound may be used in substantially equimolar amounts relative to the dihydroxy aromatic compounds or mixture of dihydroxy aromatic compounds used in the reaction mixture. The term "substantially equimolar amounts" means a molar ratio of the dihalo aromatic compound(s) to dihydroxy aromatic compound(s) is about 0.85 to about 1.2, preferably about 0.9 to about 1.1, and most preferably from about 0.98 to about 1.02.

After completing the reaction, the polymer may be separated from the inorganic salts, precipitated into a non-solvent and collected by filtration and drying. The drying may be carried out either under vacuum and/or at high temperature, as is known commonly in the art. Examples of non-solvents include water, methanol, ethanol, propanol, butanol, acetone, methyl ethyl ketone, methyl isobutyl ketone, gamma.-butyrolactone, and combinations thereof. Water and methanol are the preferred non-solvents.

The glass transition temperature, $T_g$, of the polymer typically ranges from about 120° C. to about 280° C. in one embodiment, and ranges from about 140° C. to about 200° C. in another embodiment. In some specific embodiments, the $T_g$ ranges from about 140° C. to about 190° C., while in other specific embodiments, the $T_g$ ranges from about 150° C. to about 180° C.

The polyarylether may be characterized by number average molecular weight ($M_n$) and weight average molecular weight ($M_w$). The various average molecular weights $M_n$ and $M_w$ are determined by techniques such as gel permeation chromatography, and are known to those of ordinary skill in the art. In one embodiment, the $M_n$ of the polymer may be in the range from about 10,000 grams per mole (g/mol) to about 1,000,000 g/mol. In another embodiment, the $M_n$ ranges from about 15,000 g/mol to about 200,000 g/mol. In yet another embodiment, the $M_n$ ranges from about 20,000 g/mol to about 100,000 g/mol. In still a further embodiment the Mn ranges from about 40,000 g/mol to about 80,000 g/mol In some embodiments, the hollow fiber membrane comprises a polyarylether blended with at least one additional polymer, in particular, blended with or treated with one or more agents known for promoting biocompatibility. The polymer may be blended with the polyarylether to impart different properties such as better heat resistance, biocompatibility, and the like. Furthermore, the additional polymer may be added to the polyarylether during the membrane formation to modify the morphology of the phase inverted membrane structure produced upon phase inversion, such as asymmetric membrane structures. In addition, at least one polymer that is blended with the polyarylether may be hydrophilic or hydrophobic in nature. In some embodiments, the polyarylether is blended with a hydrophilic polymer.

The hydrophilicity of the polymer blends may be determined by several techniques known to those skilled in the art. One particular technique is that of determination of the contact angle of a liquid such as water on the polymer. It is generally understood in the art that when the contact angle of water is less than about 40-50° C., the polymer is considered to be hydrophilic, while if the contact angle is greater than about 80°, the polymer is considered to be hydrophobic.

One hydrophilic polymer that may be used is polyvinylpyrrolidone (PVP). In addition to, or instead of, polyvinylpyrrolidone, it is also possible to use other hydrophilic polymers which are known to be useful for the production of membranes, such as polyoxazoline, polyethyleneglycol, polypropylene glycol, polyglycolmonoester, copolymers of polyethyleneglycol with polypropylene glycol, water-soluble cellulose derivatives, polysorbate, polyethylene-polypropylene oxide copolymers and polyethyleneimines. PVP may be obtained by polymerizing a N-vinylpyrrolidone using standard addition polymerization techniques known in the art. One such polymerization procedure involves the free radical polymerization using initiators such as azobisisobutyronitrile (AIBN), optionally in the presence of a solvent. PVP is also commercially available under the tradenames PLASDONE® from ISP COMPANY or KOLLIDON® from BASF. Use of PVP in hollow fiber membranes is described in U.S. Pat. Nos. 6,103,117, 6,432,309, 6,432,309, 5,543,465, incorporated herein by reference.

When the membrane comprises a blend of the polyarylether and PVP, the blend comprises from about 1% to about 80% polyvinylpyrrolidone in one embodiment, preferably 5-50%, and from about 2.5% to about 25% polyvinylpyrrolidone based on total blend components in another embodiment.

PVP may be crosslinked by known methods prior to use to avoid eluting of the polymer with the medium. U.S. Pat. No. 6,432,309, and U.S. Pat. No. 5,543,465, the disclose methods for crosslinking PVP. Some exemplary methods of crosslinking include, but are not limited to, exposing it to heat, radiation such as X-rays, ultraviolet rays, visible radiation, infrared radiation, electron beams; or by chemical methods such as, but not limited to, treating PVP with a crosslinker such as potassium peroxodisulfate, ammonium peroxopersulfate, at temperatures ranging from about 20° C. to about 80° C. in aqueous medium at pH ranges of from about 4 to about 9, and for a time period ranging from about 5 minutes to about 60 minutes. The extent of crosslinking may be controlled, by the use of a crosslinking inhibitor, for example, glycerin, propylene glycol, an aqueous solution of sodium disulfite, sodium carbonate, and combinations thereof.

The hydrophilicity of the polymer blends may be determined by several techniques known to those skilled in the art. One particular technique is that of determination of the contact angle of a liquid such as water on the polymer. It is generally understood in the art that materials exhibiting lower contact angles are considered to be more hydrophilic.

In other embodiments, the polyarylether is blended with another polymer. Examples of such polymers that may be used include polysulfone, polyether sulfone, polyether urethane, polyamide, polyether-amide, and polyacrylonitrile.

In one particular embodiment, the at least one additional polymer contains an aromatic ring in its backbone and a sulfone moiety as well. These polymers include polysulfones, polyether sulfones or polyphenylenesulfones or copolymers therefrom. Such polymers are described in U.S. Pat. Nos. 4,108,837, 3,332,909, 5,239,043 and 4,008,203. Examples of commercially available polyethersulfones are RADEL R® (a polyethersulfone made by the polymerization of 4,4'-dichlorodiphenylsulfone and 4,4'-biphenol), RADEL A® (PES) and UDEL® (a polyethersulfone made by the polymerization of 4,4'-dichlorodiphenylsulfone and bisphenol A), both available from Solvay Chemicals.

The membranes for use in the methods and apparatus of the present invention may be made by processes known in the art. Several techniques for membrane formation are known in the art, some of which include, but are not limited to: dry-phase separation membrane formation process in which a dissolved polymer is precipitated by evaporation of a sufficient amount of solvent to form a membrane structure; wet-phase separation membrane formation process in which a dissolved polymer is precipitated by immersion in a non-solvent bath to form a membrane structure; dry-wet phase separation membrane formation process which is a combination of the dry and the wet-phase formation processes; thermally-induced phase-separation membrane formation process in which a dissolved polymer is precipitated or coagulated by controlled cooling to form a membrane structure. Further, after the formation of a membrane, it may be subjected to a membrane conditioning process or a pretreatment process prior to its use in a separation application. Representative processes may include thermal annealing to relieve stresses or pre-equilibration in a solution similar to the feed stream the membrane will contact.

Without being bound to theory, it is understood that dialysis works on the principle of the diffusion of solutes across a porous membrane. During dialysis, a feed fluid that is to be purified passes on one side of a membrane, and a dialysis fluid is passed on the other side of the membrane. By altering the composition of the dialysis fluid, a concentration gradient of undesired solutes is formed such that there is a lesser concentration of the undesired solute in the dialysis fluid as compared to the feed fluid. Thus, the undesired solutes will pass through the membrane while the rest of the solutes pass through with the now purified fluid. The membrane may also be designed to have specific pore sizes so that solutes having sizes greater than the pore sizes may not be able to pass through. Pore size refers to the radius of pores in the active layer of the membrane. Pore size of membranes according to the present invention ranges from about 0.5 to about 100 nm, preferably from about 4 to about 50 nm, more preferably from about 4 to about 25 nm, even more preferably from about 4 to about 15 nm, and even more preferably from about 5.5 to about 9.5 nm.

A dialysis apparatus generally comprises a plurality of hollow fiber (HF) membranes that are stacked or bundled together to form a module. The fluid to be purified is fed into the feed line, which is then allowed to pass through the dialysis lines, while coming in contact with the membranes. On the other side of the membranes, the dialysis fluid is allowed to pass. The feed fluid may also be pumped under pressure, thus causing a pressure differential between the feed fluid and the dialysis fluid. During the contact, the concentration gradient between the feed fluid and the dialysis fluid and the membrane pore size causes undesirable solutes to diffuse through the membranes, while the fluid passes through towards the fluid outlet as the permeate, and the undesirable solutes come out through the retentate line. The solutes in the dialysis fluid may be chosen in such a way to effect efficient separation of only specific solutes from the feed fluid.

General methods for preparation of porous hollow fibers and dialysis modules are described in U.S. Pat. No. 6,103,117 incorporated herein by reference. Hemofiltration/hemodialysis modules and their manufacture are also described in U.S. Pat. No. 5,202,023, which is incorporated herein by reference. Fabrication of hemofiltration/hemodialysis modules membranes is also described in U.S. Pat. Nos. 4,874,522, 5,232,601 5,762,798 5,879,554 and 6,103,117, all of which are incorporated herein by reference.

Hemodialysis is one instance of dialysis wherein blood is purified by using a hemodialysis apparatus. In hemodialysis, a patient's blood is passed through a system of tubing via a machine to the membrane, which has dialysis fluid running on the other side. The cleansed blood is then returned via the circuit back to the body. It is one object of the invention to provide hollow fiber membranes for a hemodialysis unit.

Definitions

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, furanyl, thienyl, naphthyl, and biphenyl radicals. The aromatic aryl radical may be substituted. Subtituents include a member or members selected from the group consisting of F, Cl, Br, I, alkyl, aryl, amide, sulfonamide, hydroxyl, aryloxy, alkoxy, thioalkoxy, thioaryloxy, carbonyl, sulfonyl, carboxylate, carboxylic ester, sulfone, phosphonate, sulfoxide, urea, carbamate, amine, phosphinyl, nitro, cyano, acylhydrazide, hydrazide, imide, imine, amidates, amidines, oximes, peroxides, diazo, azide and the like.

As used herein the term "aliphatic radical" refers to an organic radical having a valence of at least one consisting of a linear or branched array of atoms both cyclic and non-cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" organic radicals substituted with a wide range of functional groups such as alkyl groups, alkenyl groups, alkynyl groups, F, Cl, Br, I, alkyl, aryl, amide, sulfonamide, hydroxyl, thioalkoxy, thioaryloxy, carbonyl, sulfonyl, carboxylate, carboxylic ester, sulfone, phosphonate, sulfoxide, urea, carbamate, amine, phosphinyl, nitro, cyano, acylhydrazide, hydrazide, imide, imine, amidates, amidines, oximes, peroxides, diazo, azide, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. The polymer may contain or be further functional with hydrophilic groups, including hydrogen-bond acceptors that have overall, electrically neutral charge.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Asymmetric membrane refers to a membrane that is constituted of two or more structural planes of non-identical morphologies.

Dialysis refers to a process effected by one or more membranes in which transport is driven primarily by pressure differences across the thickness of the one or more membrane.

Hemodialysis refers to a dialysis process in which biologically undesired and/or toxic solutes, such as metabolites and by-products are removed from blood.

Molecular-weight cutoff refers to the molecular weight of a solute below which about 90% of the solute is rejected for a given membrane.

EXAMPLES

Example 1

Synthesis of Methylated Polysulfone

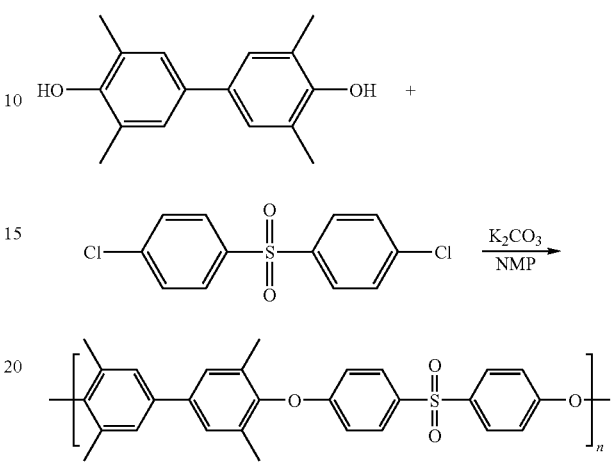

To a round bottom flask was added 3,3',5,5'-tetramethylbiphenyl-4,4'-diol (9.693 g, 40.0 mmol), potassium carbonate (8.30 g, 60 mmol), and NMP (66 ml). The reaction mixture was heated to 170° C. Toluene (60 ml) was added dropwise to the reaction mixture, and being distilled out. After about 2 h, bis(4-chlorophenyl)sulfone (11.49 g, 40.0 mmol) was added. The reaction was heated to 200° c., and kept for another 4 hours. The solution was diluted with NMP, before it was precipitated into water. The polymer collected was washed with water and methanol, and dried in vacuo to afford a white powder (17.3 g). $T_g=280°$ C.

Example 2

Synthesis of Methylated Polysulfone

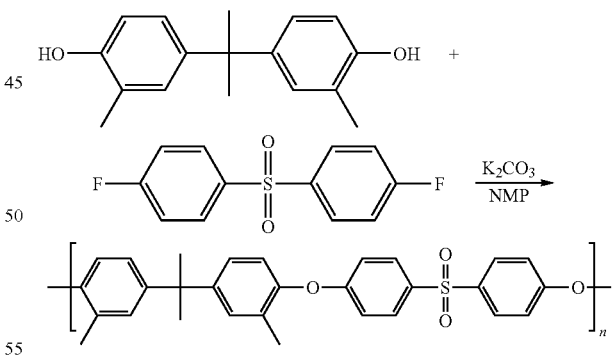

To a round bottom flask was added 2,2-bis(4-hydroxy-3-methyl-phenyl)propane (12.82 g, 50.0 mmol), potassium carbonate (13.8 g, 100 mmol), and NMP (40 ml). The reaction mixture was heated to 170° C. Toluene was added dropwise to the reaction mixture, and being distilled out. After about 2 hours, bis(4-fluorophenyl)sulfone (12.712 g, 50.0 mmol) was added. The reaction was heated to 200° c., and kept for another 4 hours. The solution was diluted with NMP, before it was precipitated into water. The polymer collected was washed with water and methanol, and dried in vacuo to afford a white powder (22.2 g).

Example 3
Bromination of Tetramethyl Biphenol Polysulfone

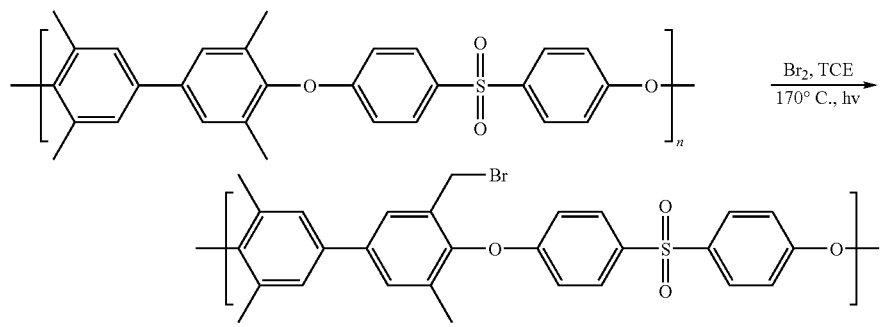

To a round bottom flask was added the polysulfone of Example 1 (8.0 g, 17.6 mmol) and tetrachloroethane (50 ml). The solution was heated to reflux. A UV lamp (100 W 2.5 A Longwave) was operated on the flask. Bromine (2.8 g, 18 mmol) was added dropwise to the refluxing solution. After the addition was finished, the reflux was kept for 1.5 hours. The solution was cooled down, before it was precipitated into methanol. The polymer collected was washed with methanol, and dried in vacuo to afford a white powder (8.8 g). The degree of bromination was determined to be around 96% by NMR analysis.

Example 4
Bromination of Tetramethyl Biphenol Polysulfone

To a round bottom flask was added the polysulfone of Example 1 (1.82 g, 4 mmol) and tetrachloroethane (24 ml). The solution was heated to reflux. A UV lamp (0.2 A Longwave) was operated on the flask. Bromine (0.71 g, 4.4 mmol) was added dropwise to the refluxing solution. After the addition was finished, the reflux was kept for 1.5 hours. The solution was cooled down, before it was precipitated into methanol. The polymer collected was washed with methanol, and dried in vacuo to afford a white powder (2.03 g). The degree of bromination was determined to be around 57% by NMR analysis.

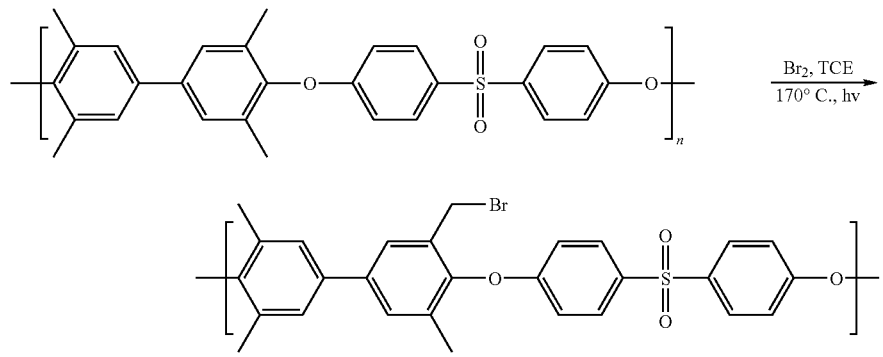

Examples 5-9
Bromination of Bisphenol C Polysulfone

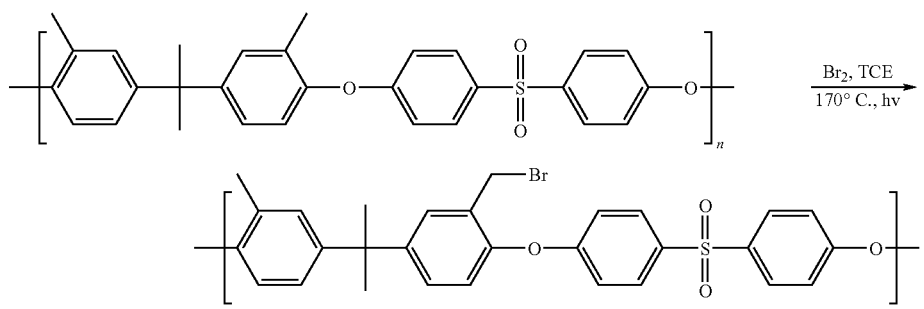

To a round bottom flask was added the polysulfone of Example 4 (14.1 g, 30 mmol) and tetrachloroethane (120 ml). The solution was heated to reflux. A UV lamp (0.2 A Longwave) was operated on the flask (Note: bromination was also be achieved with out UV irradiation). Bromine (6.72 g, 42 mmol) was added dropwise to the refluxing solution. After the addition was finished, the reflux was kept for another hour. The solution was cooled down, before it was precipitated into methanol. The polymer collected was washed with methanol, and dried in vacuo to afford a white powder (16.0 g). The degree of bromination was determined to be around 106% by NMR analysis.

A similar procedure was used for Examples 6-9. Relative amounts of bromine and the polysulfone of Example 4, and resulting degree of bromination, are shown in Table 1.

TABLE 1

| Ex. No. | Polysulfone (mmol) | $Br_2$ (mmol) | Degree of Bromination, % (product) |
|---|---|---|---|
| 6 | 6.38 | 17.9 | 145 |
| 7 | 4.25 | 8.93 | 114 |
| 8 | 4.25 | 5.95 | 74 |
| 9 | 4.25 | 2.97 | 43 |

Notes:
1. UV intensity affected the degree of bromination.
2. The degree of bromination iss defined as the number of bromines per sulfone repeat unit, which was be determined by $^1$H NMR analysis.

Nucleophilic Substitutions on Brominated Polysulfones

Example 10

Substitution on Brominated Polysulfone

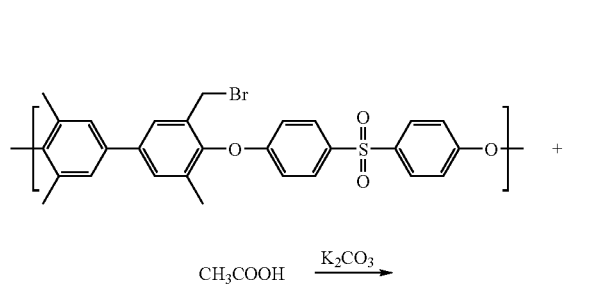

To a stirred solution of the brominated polysulfone of Example 9 (180 mg, Degree of Bromination ~66%) and acetic acid (27 mg) in DMF (2 ml) was added $K_2CO_3$ (49 mg). The mixture was stirred at room temperature overnight. The polymer was precipitated in water, and collected and dried (yield 180 mg).

Example 11

Substitution on Brominated Polysulfone

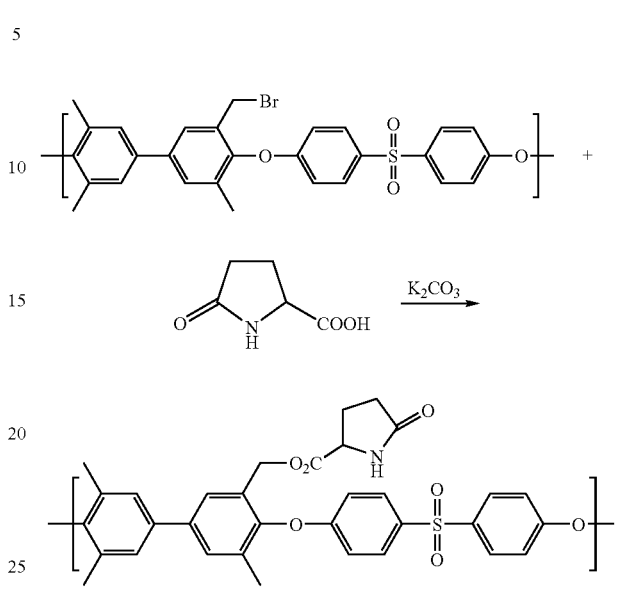

To a stirred solution of the brominated polysulfone of Example 4 (150 mg, Degree of Bromination ~57%) and 2-pyrrolidone-5-carboxylic acid (46 mg) in DMF (3 ml) was added $K_2CO_3$ (41 mg). The mixture was stirred at room temperature overnight. The polymer was precipitated in water, and collected and dried (yield, 150 mg).

Example 12

Substitution on Brominated Polysulfone

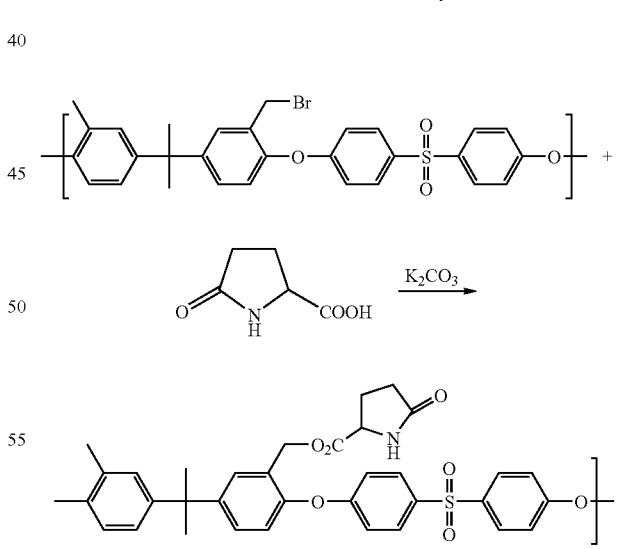

To a stirred solution of the brominated polysulfone of Example 6 (300 mg, Degree of Bromination ~145%) and 2-pyrrolidone-5-carboxylic acid (190 mg) in DMF (5 ml) was added $K_2CO_3$ (72 mg). The mixture was stirred at room temperature overnight. The polymer was precipitated in water, and collected and dried (yield, 301 mg).

Example 13

Substitution on Brominated Polysulfone

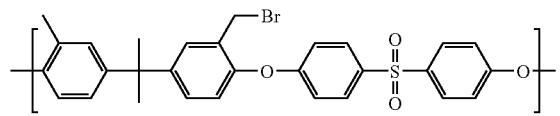

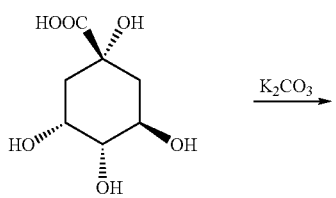

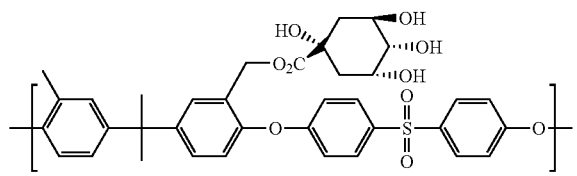

To a stirred solution of the brominated polysulfone of Example 6 (300 mg, Degree of Bromination~145%) and quinic acid (284 mg) in DMF (5 ml) was added $K_2CO_3$ (102 mg). The mixture was stirred at room temperature overnight. The polymer was precipitated in water, and collected and dried.

Example 14

Substitution on Brominated Polysulfone

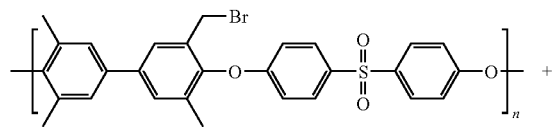

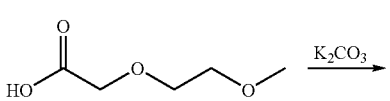

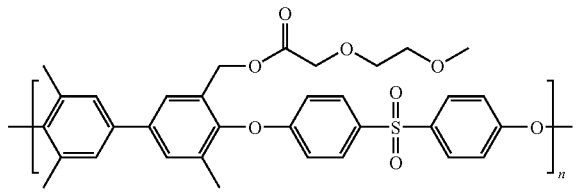

To a stirred solution of the brominated polysulfone of Example 4 (150 mg, Degree of Bromination ~57%) and 2-(2-methoxyethoxy) acetic acid (48 mg) in DMF (3 ml) was added $K_2CO_3$ (41 mg). The mixture was stirred at room temperature overnight. The polymer was precipitated in water, and collected and dried (yield, 145 mg).

Example 15

Substitution on Brominated Polysulfone

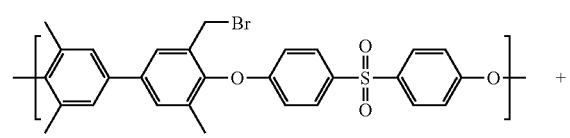

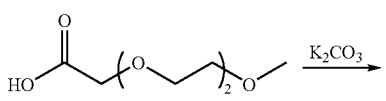

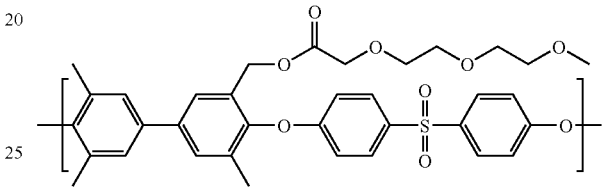

To a stirred solution of the brominated polysulfone of Example 4 (150 mg, Degree of Bromination ~57%) and 2-[2-(2-Methoxyethoxy)ethoxy]acetic acid (64 mg) in DMF (3 ml) was added $K_2CO_3$ (41 mg). The mixture was stirred at room temperature overnight. The polymer was precipitated in water, and collected and dried (yield, 150 mg).

Example 16

Substitution on Brominated Polysulfone

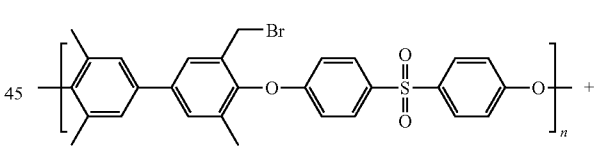

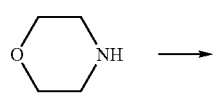

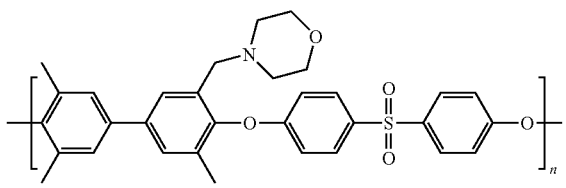

To a stirred solution of the brominated polysulfone of Example 4 (150 mg, Degree of Bromination ~57%) in DMF (3 ml) was added morpholine (740 mg). The mixture was stirred at room temperature overnight. The polymer was precipitated in water, and collected and dried (yield, 140 mg).

Example 17

Substitution on Brominated Polysulfone

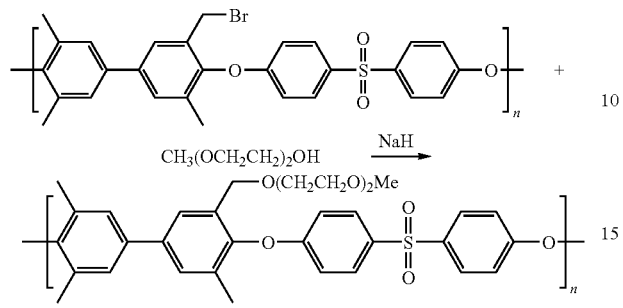

To a reaction flask was diethylene glycol methyl ether (60 mg, 0.5 mmol) and DMF (2 ml). The mixture was cooled to 0° C., followed by the addition of NaH (14.4 mg, 0.6 mmol). The reaction was slowly warmed to room temperature and stirred for another 30 min. The brominated polysulfone of Example 9 (120 mg, Degree of Bromination~66%) in 3 ml of DMF was added. The reaction was continued for 24 hours, before it was precipitated in water. The polymer was collected and dried (yield, 108 mg).

Examples 18-19

Bromination of Polysulfones

Aromatic bromination of commercially available polysulfones, Udel and Radel R, was controlled by the amount of bromine added.

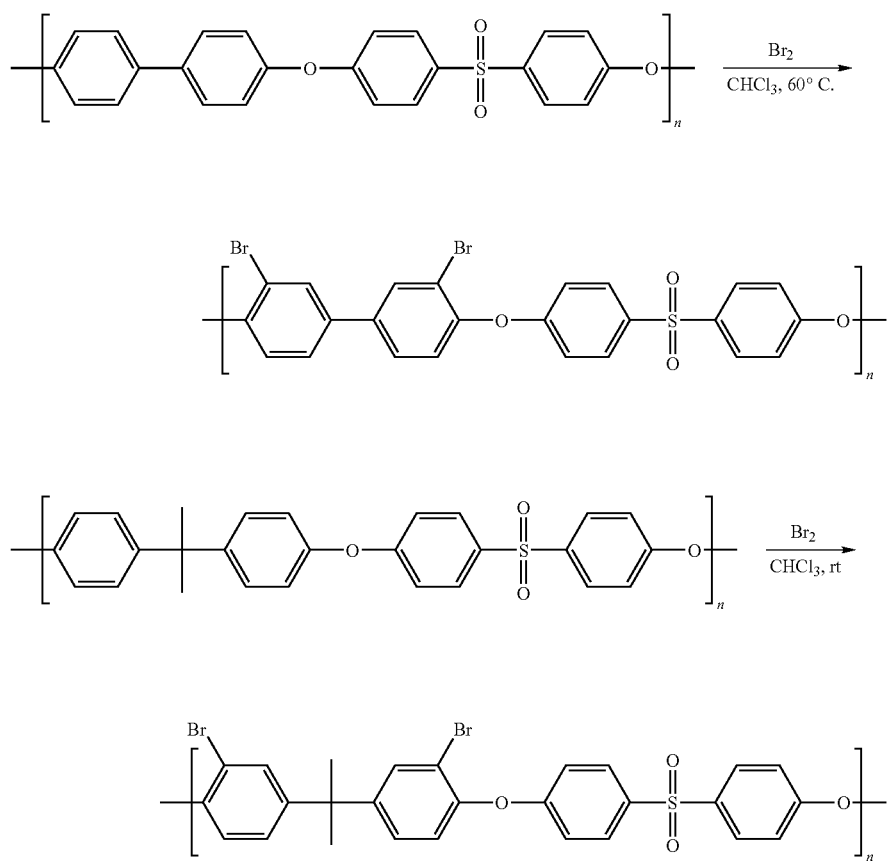

| Ex. No. | Bromine Added | Degree of Brom. |
| --- | --- | --- |
| 18. | 2.0 eq | ~80% |
| 19. | 1.5 eq | ~65% |

Functionalization of Aromatic Brominated Polysulfones

Example 20

Coupling of Brominated Udel with 2-Pyrrolidone

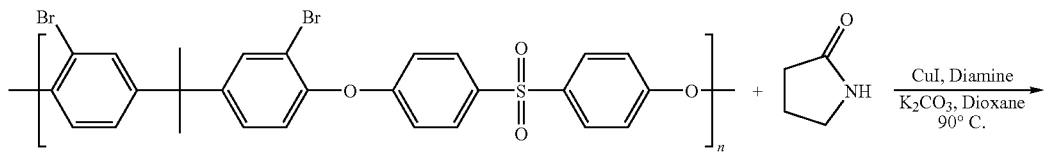

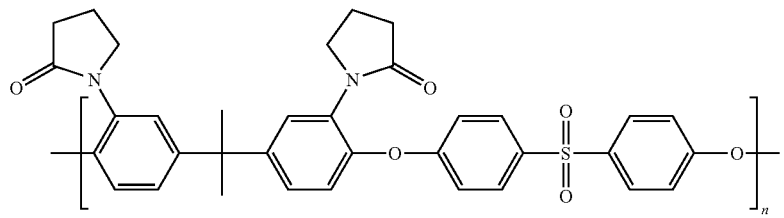

To a reaction flask was added brominated Udel (1.6 Br/Repeat Unit, 6 g), 2-pyrrolidone (1.7 g, 20 mmol), $K_2CO_3$ (5.6 g, 40 mmol), and CuI (121 mg, 1.1 mmol). Dioxane (40 mol) was then added. The reaction flask was sealed, and flushed with nitrogen for 10 min. N,N'-dimethylethylenediamine (220 mg, 2 mmol) was added via a syringe. The reaction flask was heated at 90° C. for 24 h. The reaction mixture was cooled to room temperature, and dioxane (10 ml) was added. The solution was precipitated in water, the polymer was dried (6.01 g).

Example 21

Coupling of Brominated Udel with 2-oxazolidone

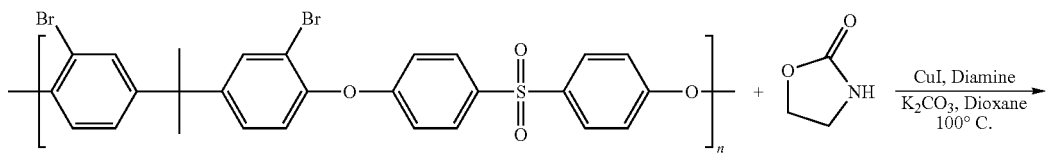

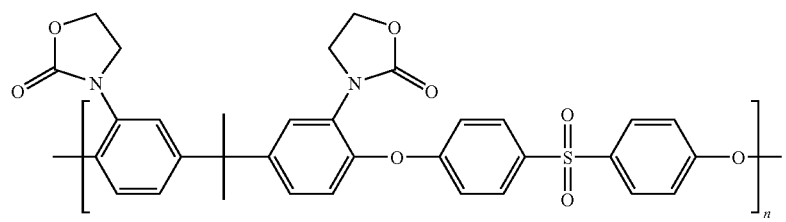

To a reaction flask was added brominated Udel (1.6 Br/Repeat Unit, 6 g), 2-oxazolidone (1.74 g, 20 mmol), $K_2CO_3$ (5.6 g, 40 mmol), and CuI (200 mg, 1.0 mmol). Dioxane (40 mol) was then added. The reaction flask was sealed, and flushed with nitrogen for 10 min. N,N'-dimethylethylenediamine (200 mg, 2 mmol) was added via a syringe. The reaction flask was heated at 100° C. for 24 h. The reaction mixture was cooled to room temperature. DMAC (5 ml) was added, and the solution was stirred at 95° C. for 5 h. The solution was precipitated in water, and the polymer was dried (5.9 g).

Example 22

Coupling of Brominated Udel with N-methylformamide

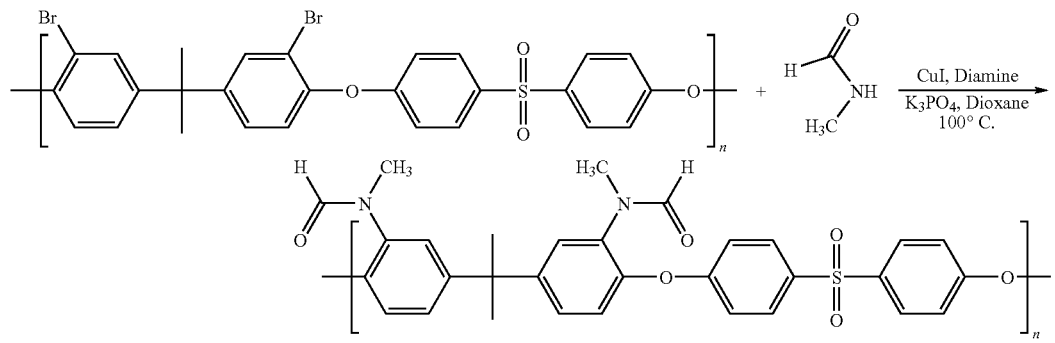

To a reaction flask was added brominated Udel (1.6 Br/Repeat Unit, 6 g), N-methylformamide (1.30 g, 22 mmol), K$_3$PO$_4$ (8.5 g, 40 mmol), and CuI (190 mg, 1.0 mmol). Dioxane (40 mol) was then added. The reaction flask was sealed, and flushed with nitrogen for 10 min. N,N'-dimethylethylenediamine (200 mg, 2 mmol) was added via a syringe. The reaction flask was heated at 92° C. for 24 h. The reaction mixture was cooled to room temperature. DMAC (20 ml) was added. The solution was precipitated in water, and the polymer was dried (5.6 g).

Example 23

Effect of Ligand, Solvent, and Base on Coupling

Systematic investigations were conducted to increase the conversion of this transformation. A series of factors which included ligands, solvents, and bases were scanned.

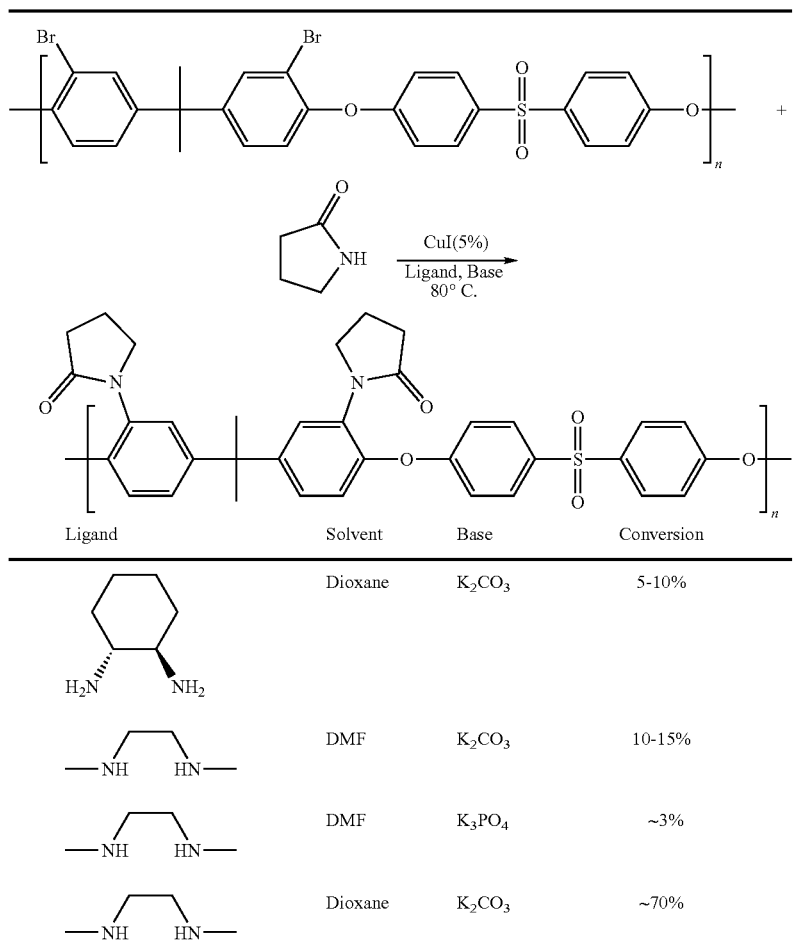

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A functional polyarylether comprising structural units of formula I

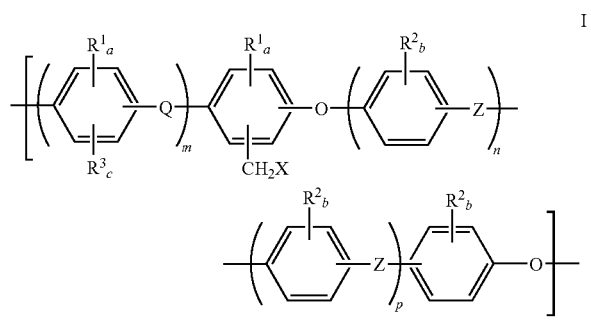

wherein

X is selected $OOCR^6$, $R^7$, $NR^4COR^5$, $NR^4CONR^5R^6$, $NR^4COOR^5R^6$,

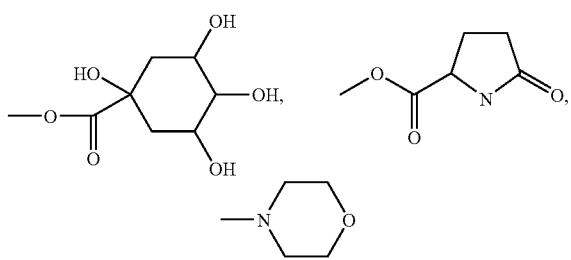

and combinations thereof;

$R^1$, $R^2$ and $R^3$ are independently at each occurrence $CH_2X$, H, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

$R^4$ and $R^5$ are independently H, a $C_{1\text{-}10}$ aliphatic radical, a $C_3$-$C_{12}$ cycloaliphatic radical, a $C_3C_{12}$ aromatic radical, or a combination thereof;

$R^6$ is H, a $C_{2\text{-}10}$ aliphatic radical, a $C_3$-$C_{12}$ cycloaliphatic radical, a $C_3$-$C_{12}$ aromatic radical or a combination thereof;

$R^7$ is $OCH_2CH_2(OCH_2CH_2)_qOCH_3$ or $OOCCH_2(OCH_2CH_2)_qOCH3$;

Q is a direct bond, O, S, alkenyl, alkynyl, a $C_1$-$C_{12}$ aliphatic radical, a $C_3C_{12}$ cycloaliphatic radical, a $C_3$-$C_{12}$ aromatic radical or a combination thereof;

Z is a direct bond, O, S, SO, $SO_2$, CO, phenylphospinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2;

m, n and p are independently 0 or 1; and q is 1-8;

with the proviso that when Z is $C(CH_3)_2$, X is not Br or OAc.

2. A functional polyarylether according to claim 1, wherein Z is $SO_2$.

3. A functional polyarylether according to claim 1, wherein X is $NR^4COR^5$.

4. A functional polyarylether according to claim 1, wherein Q is a direct bond.

5. A functional polyarylether according to claim 1, wherein Q is $C(CH_3)_2$.

6. A functional polyarylether according to claim 1, comprising structural units of formula III

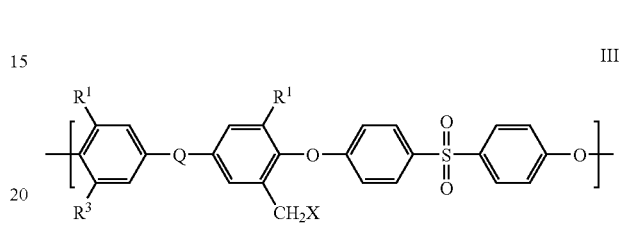

wherein

X is $OOCR^5$, $OR^6$ or $NR^4COR^5$.

7. A functional polyarylether according to claim 1, wherein X is selected from $OCH_2CH_2(OCH_2CH_2)_qOCH_3$, $OOCCH_2(OCH_2CH_2)_qOCH_3$,

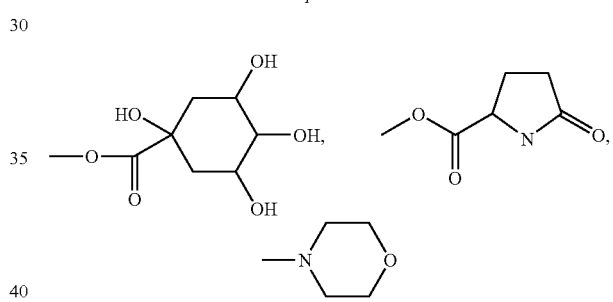

and combinations thereof.

8. A functional polyarylether according to claim 1, wherein

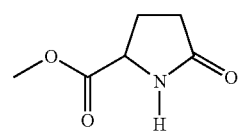

X is $OOCCH_3$ or $R^1$ and $R^2$ are independently H or $CH_3$; and

Q is a direct bond or $C(CH_3)_2$.

9. A functional polyarylether according to claim 1, having structural units of formula

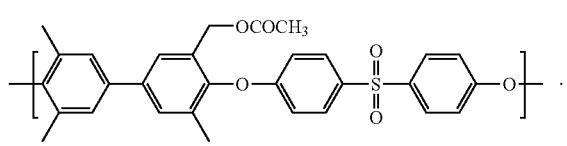

10. A functional polyarylether according to claim 1, having structural units of formula

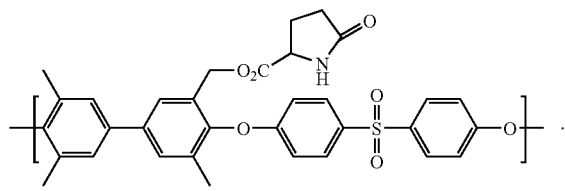

11. A functional polyarylether according to claim 1, having structural units of formula

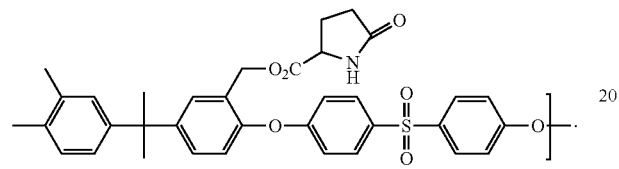

12. A functional polyarylether according to claim 1, having structural units of formula

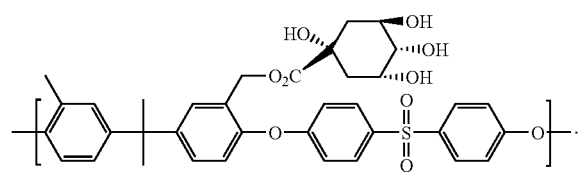

13. A functional polyarylether according to claim 1, having structural units of formula

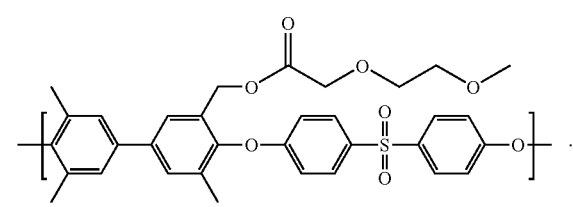

14. A membrane comprising functional polyarylether comprising structural units of formula I

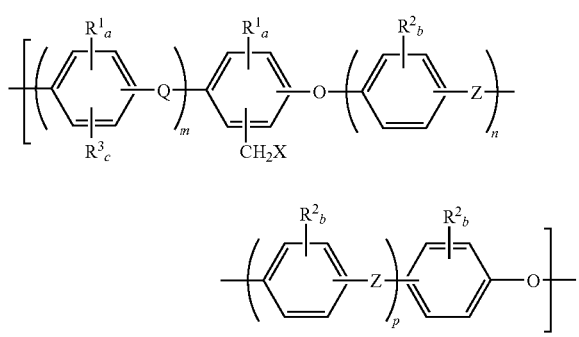

wherein

X is selected $OOCR^6$, $R^7$, $NR^4COR^5$, $NR^4CONR^5R^6$, $NR^4COOR^5R^6$,

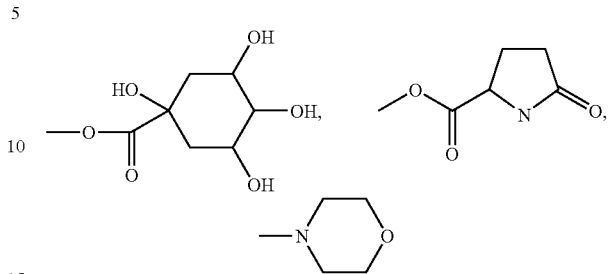

and combinations thereof;

$R^1$, $R^2$ and $R^3$ are independently at each occurrence $CH_2X$, H, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

$R^4$ and $R^5$ are independently H, a $C_{1-10}$ aliphatic radical, a $C_3$-$C_{12}$ cycloaliphatic radical, a $C_3$-$C_{12}$ aromatic radical, or a combination thereof;

$R^6$ is H, $C_{2-10}$ aliphatic radical, a $C_3$-$C_{12}$ cycloaliphatic radical, a $C_3$-$C_{12}$ aromatic radical or a combination thereof;

$R^7$ is $OCH_2CH_2(OCH_2CH_2)_qOCH_3$ or $OOCCH_2(OCH_2CH_2)_qOCH_3$;

Q is a direct bond, O, S, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

Z is a direct bond, O, S, SO, $SO_2$, CO, phenylphospinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2;

m, n and p are independently 0 or 1; and q is 1-8.

15. A separation unit comprising a plurality of hollow fiber membranes, wherein at least one of the plurality of membranes comprises a functional polyarylether according to claim 1.

16. A hemodialysis apparatus comprising a membrane according to claim 14.

17. A bioseparation apparatus comprising a membrane according to claim 14.

18. A process comprising mixing a brominating agent with a methyl polyarylether of formula

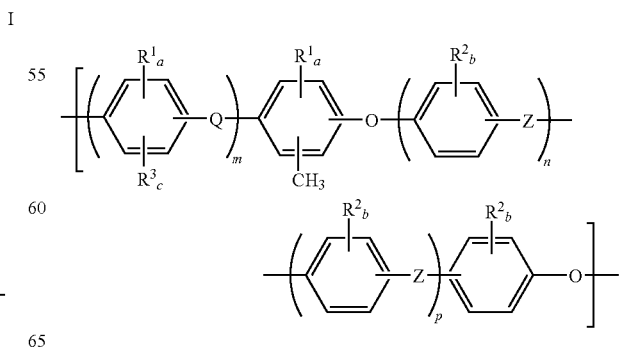

to form a bromomethyl polyarylether;

wherein

R¹, R² and R³ are independently at each occurrence $CH_2X$, H, halo, cyano, nitro, a $C_1$-$C_{12}$ aliphatic radical, a $C_3$-$C_{12}$ cycloaliphatic radical, a $C_3$-$C_{12}$ aromatic radical or a combination thereof;

Q is a direct bond O, S, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

Z is a direct bond O, S, SO, $SO_2$, phenylphospinyl oxide, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

a, b, and c are independently 1 or 2; and m, n and p are independently 0 or 1; and combining the bromomethyl polyarylether with a nucleophile under basic conditions to form a functional polvarylether;

wherein the nucleophile is selected from the group consisting of $HOOCR^6$; $HR^7$, $NR^4COR^5$, $HNR^4CONR^5R^6$, $HNR^4COOR^5R^6$,

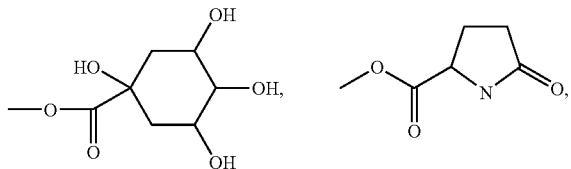

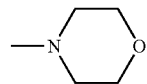

and combinations thereof;

R⁴ and R⁵ are independently H, $C_{1-10}$ aliphatic radical, $C_3$-$C_{12}$cycloaliphatic radical, a $C_3$-$C_{12}$ aromatic radical, or a combination thereof;

R⁶ is H, $C_{2-10}$ aliphatic radical, a $C_3$-$C_{12}$ cycloaliphatic radical, a $C_3$-$C_{12}$ aromatic radical or a combination thereof;

R⁷ is $OCH_2CH_2(OCH_2CH_2)_qOCH_3$ or $OOCCH_2(OCH_2CH_2)_qOCH_3$; and q is 1-8.

19. A process according to claim 18, wherein the mixture is irradiated to form the bromomethyl polyarylether.

20. A process according to claim 18, wherein the bromomethyl polyarylether is formed at a temperature ranging from about 150° C.

* * * * *